July 13, 1937.    P. E. BOHN    2,087,180
HOSE COUPLING
Filed May 20, 1936    2 Sheets-Sheet 2

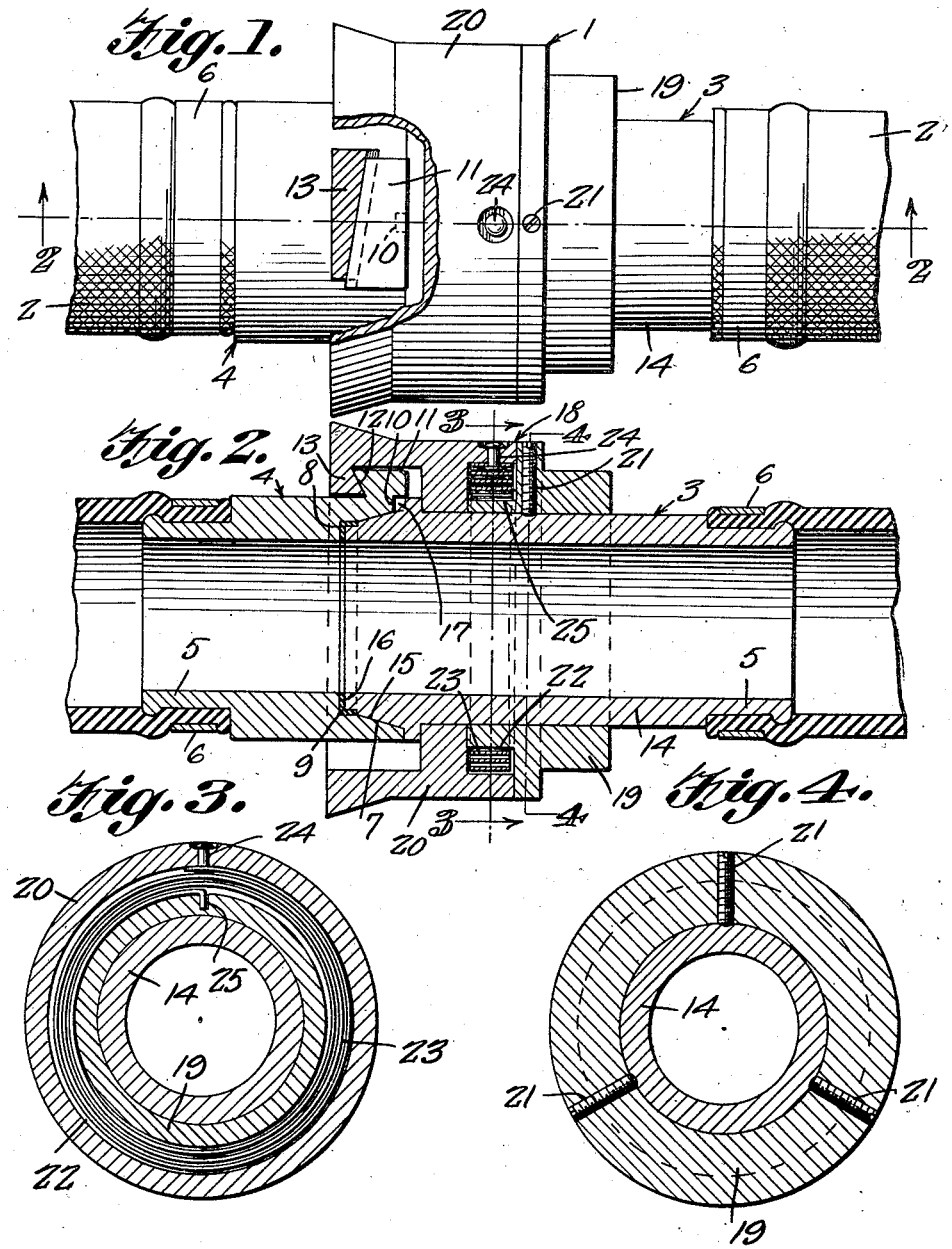

Paul E. Bohn,
INVENTOR
BY Victor J. Evans & Co.
ATTORNEYS

WITNESS

Patented July 13, 1937

2,087,180

UNITED STATES PATENT OFFICE 2,087,180

HOSE COUPLING

Paul E. Bohn, Stockton, Calif., assignor of forty per cent to Vernon C. Smith, Stockton, Calif.

Application May 20, 1936, Serial No. 80,869

1 Claim. (Cl. 285—177)

This invention relates to couplers for joining hose or pipes and has for the primary object the provision of a device of this character which when brought into coupling relation will be self-locking and will provide a non-leak connection between the hose or pipes to which it is adapted.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a coupler constructed in accordance with my invention.

Figure 2 is a sectional view taken on the line 2—2 of Figure 1.

Figure 3 is a transverse sectional view taken on the line 3—3 of Figure 2.

Figure 4 is a transverse sectional view taken on the line 4—4 of Figure 2.

Figure 5:
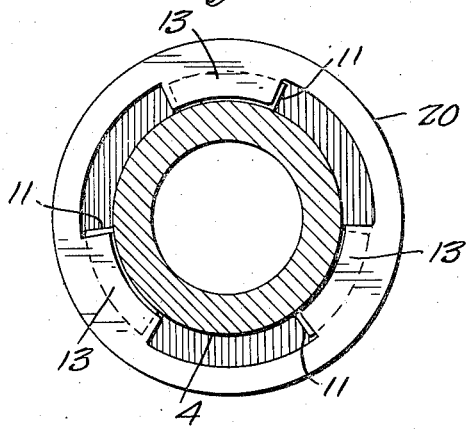
Figure 5 is a transverse sectional view showing the male and female members of the coupler brought into position for coupling.
Figure 6:
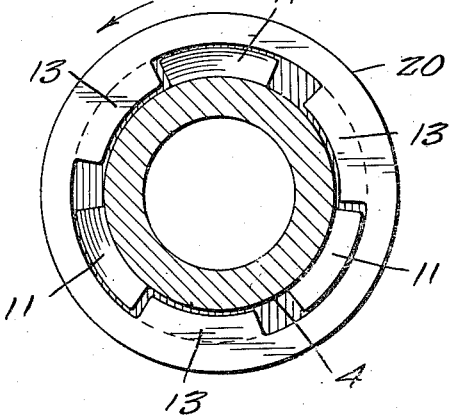
Figure 6 is a view similar to Figure 5 showing the male and female members of the coupler occupying coupling position.
Figure 7:
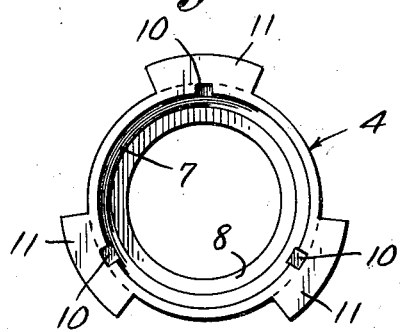
Figure 7 is an end view illustrating the female member for the coupler.
Figure 9:
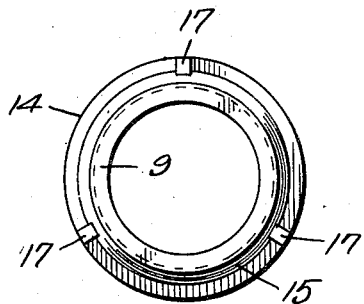
Figure 9 is an end view showing one section of the male member of the coupler.
Figure 8:
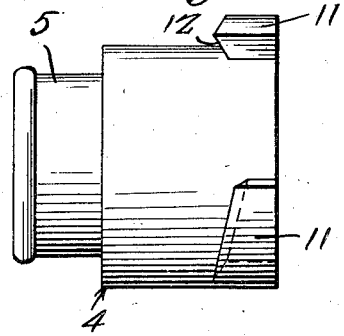
Figure 8 is a side elevation illustrating the female member of the coupler.
Figure 10:
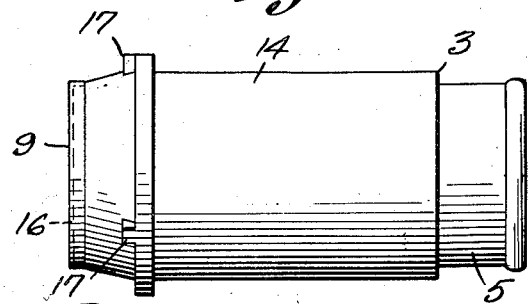
Figure 10 is a side elevation illustrating said section of the male member of the coupler.

Referring in detail to the drawings, the numeral 1 indicates in entirety a coupler which may be employed for connecting hose 2 or if desired, the coupler may be constructed for joining pipes without departing from the present invention. The coupler consists of male and female members 3 and 4. Said members 3 and 4 are shaped, as shown at 5, to have the hose 2 adapted thereto and held thereon by clamps 6.

The female member 4 has formed in its coupling end a tapered seat 7 and also angularly related faces 8 to form a gasket seat engaged by a gasket 9. The gasket includes angularly related portions conforming to the faces 8. The female member 4 in its coupling end is provided with notches 10. Formed on the female member are coupling lugs 11 each having an undercut face 12 and each lug tapers from one end towards its opposite end, as clearly shown in Figure 1. The lugs 11 are relatively spaced to permit lugs 13 of the male member 3 to pass therebetween when the male and female members are brought into coupling relation.

The male member 3 consists of a substantially tubular-shaped element 14 to which one of the hose is connected and has its opposite end tapered, as shown at 15, to abut the tapered face 7 of the female member. Said last-named end of the tubular member 14 has angularly related faces 16 to abut the gasket. Lugs 17 are formed on the tubular element 14 to be received by the notches 10 when the male and female members are brought into coupled position to prevent relative rotation of said members. The female member also consists of a sectional body 18 including sections 19 and 20. The section 19 is secured to the tubular element 14 by set bolts 21. The sections 19 and 20 are cut away to form a spring chamber 22 in which is located a spring 23 of the clock type, one end of which is secured to the section 20 by a rivet or like fastener 24, while the opposite end is bent in hook formation and received in a notch 25 formed in the section 19. The locking lugs 13 of the male member are formed on the section 20 of the body 18 and said locking lugs have undercut faces matching the faces 12 of the locking lugs 11 of the female member. Each lug 13 tapers from one end to its opposite end similar to the taper of the lugs 11.

In operation, to bring about coupling together of the hose or pipes adapted to this coupler, the section 20 of the body 18 is rotated in one direction to tension the spring. The male and female members are then brought into coupling relation, the lugs 13 moving through the spaces between the lugs 11. The section 20 of the body 18 is then released, the spring 23 acting to rotate the section 20 bringing the lugs 13 in overlapping relation with the lugs 11. As the lugs 13 move into overlapping relation with the lugs 11, wedging action is established between said lugs drawing the male and female members in tight engagement, the spring acting in a direction to continuously increase the wedging action between the lugs 13 and 11. Thus it will be seen that this coupler is self-locking when the male and female elements have been brought into coupling relation and further, it will be seen that the spring normally acts to increase the wedging action between the lugs 13 and 11. Thus it will be seen that this coupler is self-locking when the male and female elements have been brought into coupling relation and further, it will be seen that the spring normally acts to increase the wedging action between the lugs 13 and 11, consequently urging the male and female members towards each other, thereby establishing a leak proof connection between the male and female members.

Having described the invention, I claim:

A coupler comprising male and female members, locking lugs formed on the female member and each tapering from one end to the opposite end thereof, said male member including a tubular element and a body mounted thereon and composed of rotatable and fixed sections, set bolts securing the fixed sections to the tubular element, said sections being cut away to form a spring chamber, a clock type spring located in the chamber and having its ends secured to the rotatable and fixed sections of the body, and tapering locking lugs formed on the rotatable section to pass between the locking lugs of the female member when said female and male members are brought into coupling relation with the spring tensioned so that said spring will act to move the locking lugs of the rotatable section into overlapping relation with the locking lugs of the male section when the locking lugs of the rotatable section pass beyond the locking lugs of the female section and the rotatable section released.

PAUL E. BOHN.